July 5, 1966 P. L. ONASCH 3,259,301
PLASTIC-LINED BAGS AND METHOD OF MAKING
Filed March 9, 1964

INVENTOR
PAUL L. ONASCH
BY
Byerly, Townsend, Watson & Churchill
ATTORNEYS.

3,259,301
PLASTIC-LINED BAGS AND METHOD
OF MAKING
Paul L. Onasch, Newport News, Va., assignor to Arkell Safety Bag Company, New York, N.Y., a corporation of New York
Filed Mar. 9, 1964, Ser. No. 350,196
7 Claims. (Cl. 229—55)

This invention relates to plastic-lined paper bags and to a method for producing the same.

The packaging of moist materials which must be maintained fresh and protected against air, such as foodstuffs, requires almost completely non-porous wrapping material. Even heavy multi-ply paper bags are often unacceptable because moisture in the contents weakens the paper walls from the inside, or because air may penetrate through the pores of the paper. On the other hand, bags made of specially treated, non-porous paper are very expensive.

Polyethylene and certain other thermoplastic materials have been used as liners for paper bags because they are nontoxic to foods and they are excellent barriers against water and air. However, the use of plastic liners in paper bags entails time-consuming, costly manufacturing steps, such as coating the paper with a plastic resin, or adhering the plastic by other means before forming the bag, or separately preparing a plastic bag from an extruded tube and a paper bag and then joining the two bags together.

The object of this invention is to provide novel plastic-lined paper bags by a simple and inexpensive method.

The several features of this invention, whereby the aforementioned and other objects are attained, will be readily apparent from the following description and accompanying drawings, in which.

Figure 1:
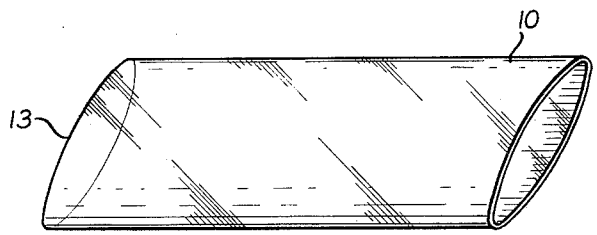
FIG. 1 is a perspective view of an extruded thermoplastic tube.

FIG. 1 shows a tube 10 open at both ends, made of a water-insoluble thermoplastic material, preferably polyethylene, which is commercially extruded as a continuous cylindrical surface. The thickness of the tube may vary depending upon the desired use of the bag; however, I prefer to use tubes having thicknesses in the range of 0.001 inch to 0.003 inch for the purposes of flexibility and economy. Other heat sealable materials may require greater or lesser thicknesses according to their tensile or bursting strength.

Figure 2:
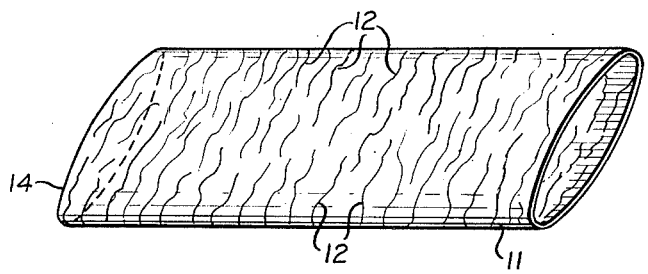
FIG. 2 is a perspective view of a crinkled and corrugated paper tube.

FIG. 2 shows an open-end paper tube 11 of substantially the same length and circumference as the polyethylene tube. The paper tube is preferably made of single ply or multi-ply kraft paper. The paper is shown as having crinkles 12, but it may also be corrugated or both crinkled and corrugated, for added elasticity and strength, or it may be simply smooth and flat. If a multi-ply paper tube is used wherein several paper tubes are adhered together, the tubes are preferably arranged in such a manner that the seam of each ply is not in contact with the seams of adjacent plies.

Figure 3:
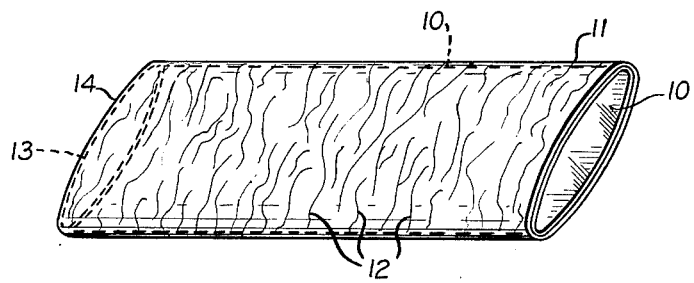
FIG. 3 is a perspective view of the thermoplastic tube inserted within the paper tube.

In FIG. 3, the tubes are united by nesting the polyethylene tube 10 inside the paper tube 11, with the edges 13 of at least one end of the inserted tube approximately co-extensive with the edges 14 of the paper tube at that end. The edges of the tubes at the other end need not be co-extensive, although it is preferred for convenience when sealing the bag after the contents have been added.

Figure 4:
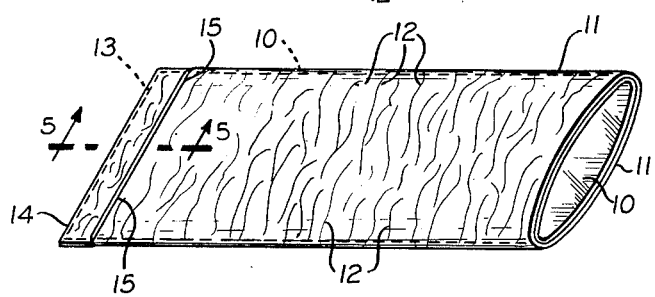
FIG. 4 is a view similar to FIG. 3 of the tubes sealed at one end.
Figure 5:
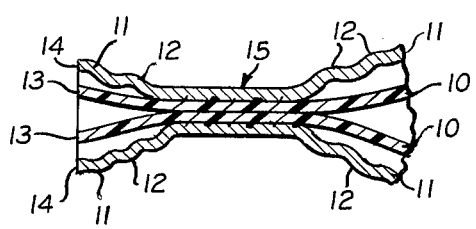
FIG. 5 is an enlarged section of the sealed tubes along line 5—5 of FIG. 4.

The final step in forming the bag is illustrated in FIGS. 4 and 5. A heat seal is transversely applied to one end of the tubes which serves as the bottom of the bag by the use of a heat-sealing mechanism. The walls of the outer paper tube and the inner plastic tube are pressed together by the sealing mechanism while heat is applied. Thereafter, the assembly is cooled to room temperature. Being thermoplastic, the material of the inner tube or liner flows together under the localized heat and creates a homogeneous weldment between the walls. With sufficient pressure applied at the same time as the heat, this weldment forms a very tight cohesive closure across the mouth of the inner tube. The pressure preferably also should be maintained during the cooling stage to insure a more uniform closure.

The thermoplastic material is simultaneously adhered to the outer paper tube. Since the paper is in constant contact with the thermoplastic material throughout the entire step, the fluid material flows readily into the interstices of the porous paper. It has thus been found that an excellent adhesion between the paper and the plastic lining is obtained upon cooling. The single heat-sealing step completely unifies both the paper and the plastic liner tubes along the narrow portion 15, thereby forming the finished bag.

Contact pressure is normally sufficient to both seal the liner and unite the tubes. The heat, however, must be at the fluid temperature of the thermoplastic material to cause adequate flow. Although thermoplastics with a very high flow temperature usually form the strongest seals, they are not always desirable because of the expensive equipment which may be required to seal them and because of possible damage to the paper during the sealing step. The flow properties of polyethylene make it the preferred thermoplastic substance for this reason. In addition, polyethylene is impervious to water and can be used to package wet contents. On the other hand, polyethylene swells in the presence of certain liquids, such as benzene. If such liquid is present in the contents, a polyethylene liner could not be safely used. The selection of plastics for the liners of this invention therefore depends to a large extent on the nature of the contents to be carried.

The heat-sealing equipment may be a simple bar-press, wherein the heat and pressure are applied along a narrow strip across the mouth of the tubes by heated metal bars. One of the fastest and most convenient machines, which I prefer to use in this invention, is a dielectric heat-sealer. The passage of a high frequency electric current into the non-conducting thermoplastic substance renders it fluid in a very short time. Most of the known thermoplastic substances have high dielectric strength and are virtually unaffected by the internal dissipation of electrical energy. Polyethylene is also preferred for this type of sealing because it forms a strong seal very quickly. The same heat-sealing apparatus may be used to close the remaining open mouth of the bag after the contents have been added.

The finished polyethylene-lined bag is a strong, waterproof container for moistened articles and foodstuffs. The seal at the bottom of the bag may be made strong enough to hold even liquids, if necessary. The closure may be strengthened by enlarging the sealing area 15, for example to extend to the edges 13 and 14 of the tubes. Additional closure means, such as the use of stitching or adhesive tape, may be provided also, particularly if the weight of the contents across the bottom surface of the bag approaches the tensile strength of the thermoplastic liner. The lined bags of my invention are strong

What I claim is:

1. A flexible lined bag comprising an outer preformed paper tube, a separate inner preformed thermoplastic tube concentrically nested within said outer tube wherein the ends of each tube are substantially coextensive, and at one end of said nested tubes a heat-sealed portion traversing the mouths of the bags at said end, said portion consisting of a closure of said inner tube and an adhesion between said inner tube and the outer tube and providing a bottom closure for said bag.

2. A flexible lined bag comprising an outer preformed crinkled, corrugated paper tube, a separate inner preformed thermoplastic tube concentrically nested within said outer tube wherein the ends of each tube are substantially co-extensive, and at one end of said nested tubes a heat-sealed strip portion traversing the mouths of the bags at said end, said strip portion forming a closure of said inner tube and an adhesion between said inner tube and the outer tube and providing a bottom closure for said bag.

3. A flexible lined bag comprising an outer preformed crinkled, multi-ply paper tube, a separate inner preformed polyethylene tube concentrically nested within said outer tube wherein the ends of each tube are substantially co-extensive and at one end of said nested tubes a heat-sealed strip portion traversing the mouths of the bags at said end, said strip portion forming both a closure of the said inner tube and an adhesion between said inner tube and the outer tube and providing a bottom closure for said bag.

4. The bag of claim 3 wherein the polyethylene has a thickness in the range of 0.001 to 0.003 inch.

5. The method of producing a flexible plastic-lined bag comprising the steps of inserting within a preformed paper tube a preformed tube of a thermoplastic material having substantially the same circumference and length as the paper tube, and applying heat and pressure across one end of the said tubes whereby simultaneously the mouth of the inserted thermoplastic tube is sealed and said thermoplastic material is bonded to the paper tube at the said end to provide a bottom closure for said bag.

6. The method of producing a flexible polyethylene-lined bag comprising the steps of inserting within a preformed crinkled paper tube a preformed tube of polyethylene having substantially the same circumference and length as the paper tube, and applying across one end of the said tubes heat and pressure, whereby simultaneously the mouth of the inserted polyethylene tube is sealed and said polyethylene is bonded to the paper tube at the same end to provide a bottom closure for said bag.

7. The method of producing a flexible polyethylene-lined bag comprising the steps of inserting within a preformed crinkled, corrugated, multi-ply paper tube a preformed tube of polyethylene having substantially the same circumference and length as the paper tube, and applying across one end of the said tubes dielectric heat and pressure, whereby simultaneously the mouth of the inserted polyethylene tube is sealed and said polyethylene is bonded to the paper tube at the same end to provide a bottom closure for said bag.

References Cited by the Examiner

UNITED STATES PATENTS

| | | | |
|---|---|---|---|
| 2,999,627 | 9/1961 | Reinhart | 229—55 |
| 3,076,592 | 2/1963 | Means et al. | 229—55 |
| 3,097,788 | 7/1963 | Nichols | 229—55 |
| 3,105,417 | 10/1963 | Hammer | 93—35 |
| 3,106,140 | 10/1963 | Baker | 93—35 |

JOSEPH R. LECLAIR, *Primary Examiner.*

GEORGE R. RALSTON, FRANKLIN T. GARRETT, *Examiners.*

R. PESHOCK, *Assistant Examiner.*